(12) United States Patent
Hata

(10) Patent No.: US 6,695,330 B2
(45) Date of Patent: Feb. 24, 2004

(54) MOTORCYCLE AND REAR BODY STRUCTURE THEREFOR

(75) Inventor: Yasuo Hata, Shizuoka (JP)

(73) Assignee: Suzuki Motor Corporation, Hamamatsu (JP)

(*) Notice: Subject to any disclaimer, the term of this patent is extended or adjusted under 35 U.S.C. 154(b) by 0 days.

(21) Appl. No.: 10/271,055

(22) Filed: Oct. 14, 2002

(65) Prior Publication Data
US 2003/0132048 A1 Jul. 17, 2003

(30) Foreign Application Priority Data
Jan. 11, 2002 (JP) ........................ P.2002-004238

(51) Int. Cl.$^7$ ............................................. B62D 25/16
(52) U.S. Cl. ..................................... 280/152.3; 180/219
(58) Field of Search ....................... 180/219; 280/152.1, 280/152.2, 152.3; 362/473

(56) References Cited

U.S. PATENT DOCUMENTS

| | | | | |
|---|---|---|---|---|
| 3,927,727 A | * | 12/1975 | Hanagan | ..................... 180/219 |
| 4,422,659 A | * | 12/1983 | Nebu | ..................... 280/152.1 |
| 4,485,884 A | * | 12/1984 | Fukunaga et al. | ........... 180/219 |
| 4,790,087 A | * | 12/1988 | Hamada et al. | ................. 40/204 |
| 4,958,451 A | * | 9/1990 | Iwakura et al. | ................. 40/204 |
| 6,257,362 B1 | * | 7/2001 | Scherbarth | ................... 180/219 |
| 6,378,643 B1 | * | 4/2002 | Galbraith et al. | ............ 180/219 |

FOREIGN PATENT DOCUMENTS

JP 62-21509 6/1987 ............ B62J/15/00

* cited by examiner

*Primary Examiner*—Kevin Hurley
(74) *Attorney, Agent, or Firm*—Darby & Darby

(57) ABSTRACT

A rear fender 1 is disposed in the periphery of a rear wheel. A rear fender front half 2 is connected to a rear fender rear half 3 in which a seat tail cowl portion 3A and a fender tail portion 3B are formed as an integral body. A tail light serving also as a brake light, a license plate illuminating light for illuminating a license plate mounting portion and a license plate 5, and a pair of direction indicating lights 6 are mounted on a rear wheel rear fender constituted by the rear fender rear half 3, thereby forming the rear wheel rear fender as a unit. The tail light is mounted on the rear wheel rear fender through a tail light bracket. The stay portions of the tail light bracket and seat tail cowl portion 3A are fastened and fixed to each other by bolts which are disposed in the base portions of the direction indicating lights 6.

6 Claims, 8 Drawing Sheets

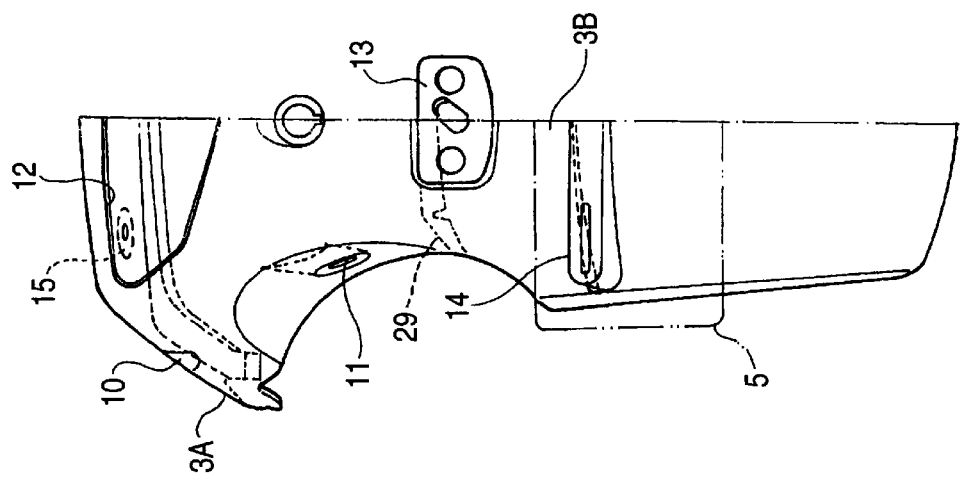
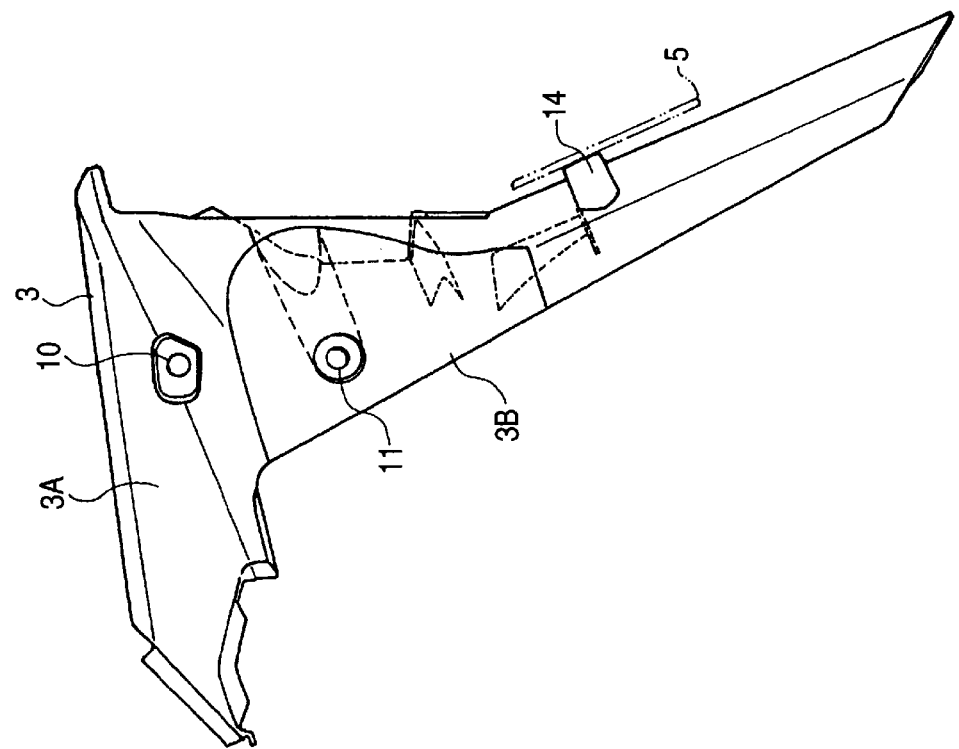

MOTORCYCLE AND REAR BODY STRUCTURE THEREFOR

BACKGROUND OF THE INVENTION

The present invention relates to a motorcycle having a body frame carrying thereon an engine, a fuel tank and a seat and, front and rear wheels rotatably supported respectively at the front of and at the rear of the body frame and, in particular, to the rear body structure of the motorcycle.

As a motorcycle of this type, conventionally, for example, as disclosed in Japanese Utility Model Postexamined Publication JP-B-62-21509U, FIG. 8 shows a rear wheel fender 1000 for a motorcycle which is composed of a rear part 1001 of a rear wheel fender (a rear fender rear half) and a front part 1002 of a rear wheel fender (a rear fender front half): specifically, the rear fender rear half 1001 is an integrally united body composed of a rear fender tail portion 1003 for covering the rear portion of a rear wheel and a seat tail cowl portion 1004 for covering the portion of the body frame situated in the rear of a seat; and, the rear wheel fender front part 1002 covers the upper and front portions of the rear wheel and includes a box-shaped storage portion 1005 formed integrally in the rear portion thereof.

In the thus structured motorcycle, in the interior of the seat cowl portion 1004 of the rear fender rear half 1001, there is disposed the box-shaped storage portion 1005 that is integrally formed in the rear portion of the rear fender front half 1002.

However, in the conventional structure in which the box-shaped storage portion is inserted into the seat cowl portion, there are present dual walls; and, therefore, a space in the interior of the seat cowl portion cannot be utilized effectively, which inconveniently reduces the storage capacity of the structure. Also, conventionally, there are used a large number of screws or bolts in mounting the composing parts of the structure on each other or in assembling the composing parts to the body frame side, that is, the composing parts are large in number, which inevitably takes time and labor to assemble the composing parts to the body frame.

SUMMARY OF THE INVENTION

The present invention aims at eliminating the drawbacks found in the conventional motorcycle rear body structure. Accordingly, it is an object of the invention to provide an improved motorcycle rear body structure that can be simplified in structure and assembly effectively.

In attaining the above object, according to the invention, there is provided a motorcycle rear body structure with a rear fender disposed in the periphery of a rear wheel, comprising: a rear fender composed of a rear fender front half and a rear fender rear half connected to each other, the rear fender rear half consisting of an integral body of a seat tail cowl portion and a fender tail portion, wherein a tail light serving also as a brake light, a license plate mounting portion and a license plate, and a pair of right and left direction indicating lights are mounted on the rear fender rear half, thereby forming the rear wheel rear fender as a unit.

In a motorcycle rear body structure according to the invention, the tail light is mounted on the rear fender rear half through a tail light bracket to be mounted on the interior of the seat tail cowl portion of the rear fender rear half, and also the tail light bracket extends forwardly along the inner surfaces of the right and left side walls of the seat tail cowl portion, and includes right and left stay portions each having a fastening portion in the front end portion thereof, while the stay portions and seat tail cowl portion are fastened and fixed to each other by bolts disposed in the base portions of the direction indicating lights.

Also, in a motorcycle rear body structure according to the invention, in the connecting portion between the rear fender front half and rear fender rear half, the rear end portion of the rear fender front half is superimposed on and connected to a shelf-shaped rib from above, the rib being interposed between the seat tail cowl portion and the fender tail portion of the rear fender rear half; and, the seat tail cowl portion of the fender tail part and the upper surface of the rear portion of the rear fender front half cooperate together in forming a storage portion.

Further, in a motorcycle rear body structure according to the invention, in the case of a front portion of the rear fender front half is fastened to and supported on a rear fender bracket front portion disposed on the front portion of a rear frame through the side walls of an onboard-motorcycle battery storage portion integrally projected up to the upper surface of the rear wheel front fender front portion, while the rear portion of the rear wheel fender front part is fastened to and supported on a rear fender bracket rear portion disposed on the rear portion of the rear frame; in the case of the rear wheel fender rear part, the upper surface of the seat tail cowl portion together with a rear carrier and the rear frame bridge rear portion of the rear frame are fastened and fixed to each other, while the lower portions of the side surfaces of the seat tail cowl portion together with the rear portion of the rear wheel fender front part and the rear fender bracket rear portion are fastened and fixed to each other; and, a projection-shaped boss is disposed on the rear fender bracket rear portion, while the rear portion mounting hole of the rear wheel fender front part is formed so as to be engageable with the projection-shaped boss.

And, according to the invention, there is provided a motorcycle, comprising: a body frame carrying thereon an engine, a fuel tank and a seat, wherein a front wheel is supported by the lower ends of a pair of front forks supported on a steering head pipe disposed on the upper front portion of the body frame, while a rear wheel is supported by a pair of swing arms disposed on the lower rear portion of the body frame, characterized by any one of the above-mentioned rear body structures.

According to the invention, the seat tail cowl portion for covering the rear portion of the seat and the fender tail portion for covering the rear portion of the rear wheel are formed as an integral body. This can enhance the appearance of the rear fender rear half, can increase the connecting strength between the seat tail cowl portion and fender tail portion, and can omit screws which are conventionally used to connect together the seat tail cowl portion and fender tail portion.

Also, when mounting the tail light or direction indicating lights onto the rear fender rear half, since the tail light and direction indicating lights are fastened and fixed to each other using the bolts for the two direction indicating lights, there can be omitted the mounting screws which are used to mount the tail light 4. Also, when mounting the unit-formed rear fender rear half onto the body frame side, the rear fender rear half and rear fender front half are fastened together in the lower portions of the side surfaces of the seat tail cowl portion, or the rear fender rear half and the rear carrier and rear frame are fastened and fixed to each other in the upper surface portion of the seat tail cowl portion, which makes it possible to omit the mounting bolts.

Thus, according to the invention, since the rear fender is formed as an integral body, not only the appearance and strength thereof can be enhanced, but also the number of composing parts thereof can be reduced. Because the composing parts are fastened to each other when mounting them onto the motorcycle body frame, screws and bolts can be omitted. As a result of this, the structure of the rear fender can be simplified and the number of steps of assembling the rear fender can be reduced.

BRIEF DESCRIPTION OF THE DRAWINGS

FIGS. 4A and 4B are side and front views of a rear fender rear half of a motorcycle rear body structure according to the above embodiment of the invention;

DETAILED DESCRIPTION OF THE PREFERRED EMBODIMENTS

Now, description will be given below of a preferred embodiment of a motorcycle rear body structure according to the invention with reference to the accompanying drawings.

Figure 1:
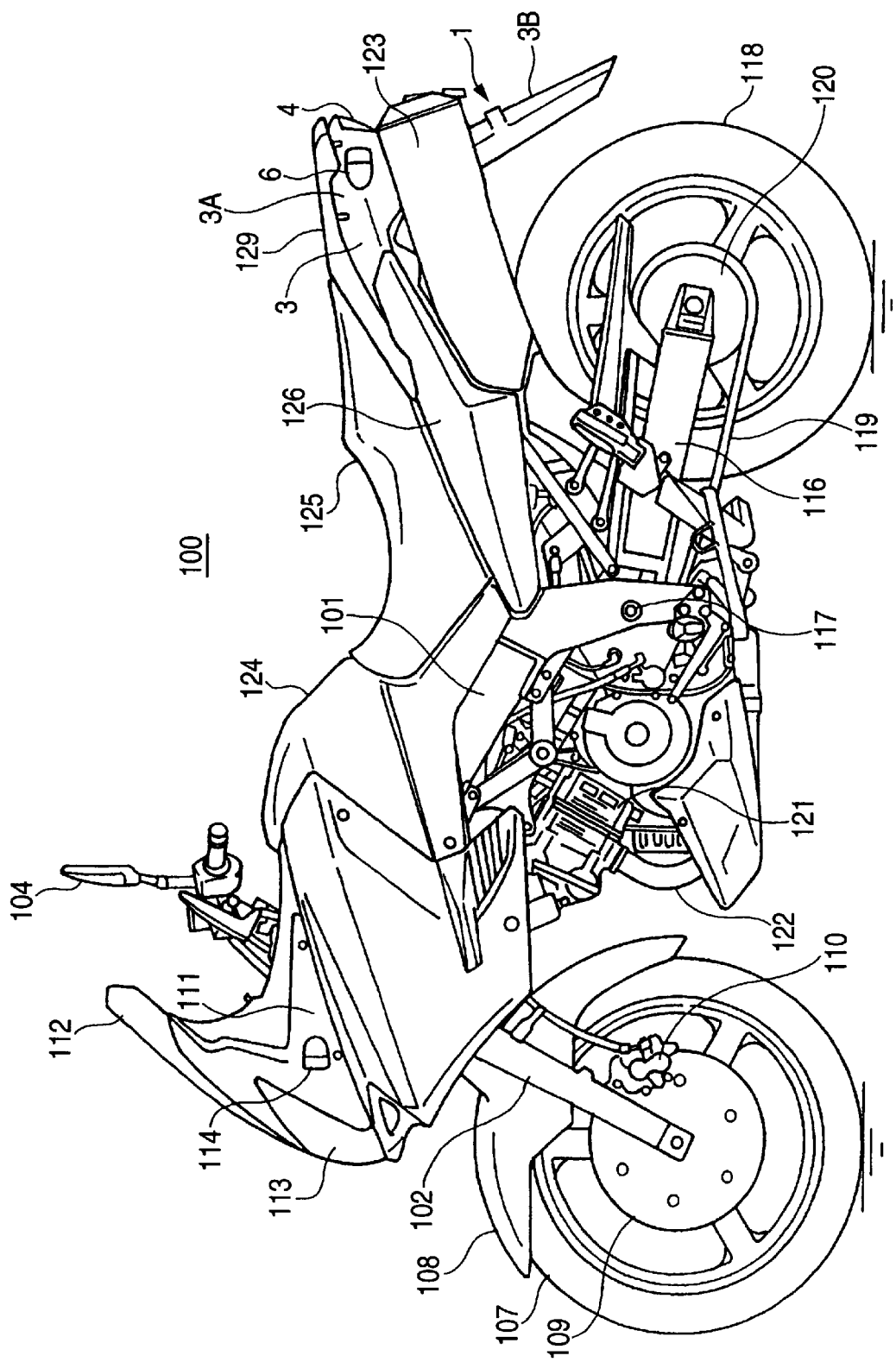
FIG. 1 is a side view of the whole structure of a motorcycle according to an embodiment of the invention.
Figure 2:
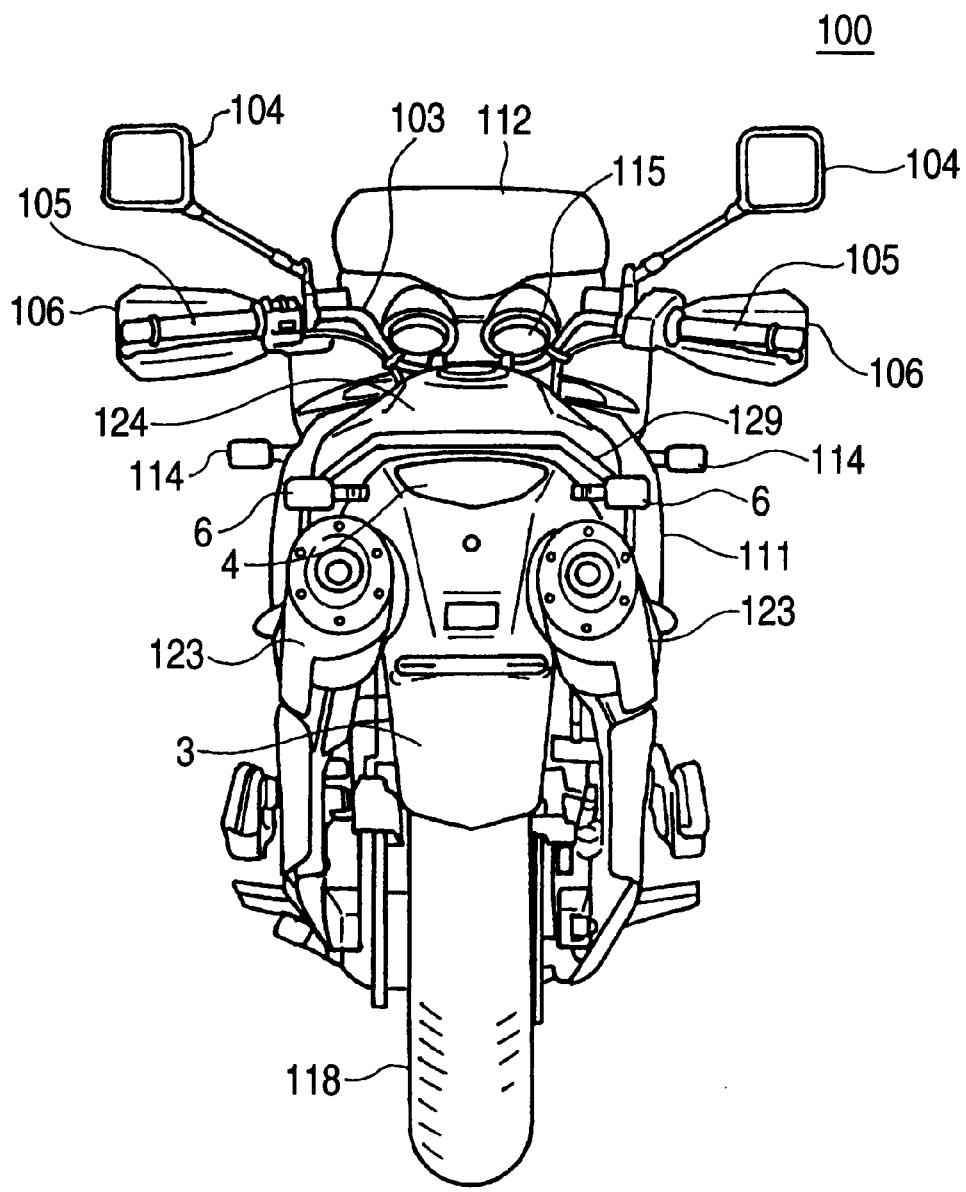
FIG. 2 is a rear view of the whole structure of a motorcycle according to an embodiment of the invention.

FIGS. 1 and 2 show the whole structure of a motorcycle according to the invention. Here, firstly, description will be given of the whole structure of a motorcycle 100 according to the present embodiment. In FIGS. 1 and 2, on the front portion of a body frame 101 made of steel or aluminum alloy material, there are disposed two front forks 102 which can be rotated in the right and left direction by a steering system inserted into a steering head pipe. To the upper end of the steering system, there are fixed handlebars 103; and, on the handlebars 103, there are erected a pair of side mirrors 104 and, the handlebars 103 include a pair of grips 105 on the two end portions thereof. And, a pair of protectors 106 are respectively disposed on the front portions of the two grips 105.

On the lower portions of the front forks 102, there is rotatably supported a front wheel 107; and, a front fender 108 is fixed so as to cover the upper portion of the front wheel 107. The front wheel 107 includes a brake disk 109 rotatable integrally with the front wheel 107, and a brake pad 110 supported by the front forks 102.

On the front portion of the body frame 101 that is situated above the front wheel 107, there is placed a fairing 111 so as to cover the steering head pipe and a fuel tank (which will be discussed later). The fairing 111 includes a screen 112 disposed on the upper portion thereof and a head light 113 disposed on the front end portion thereof; and, a pair of direction indicating lights (blinkers) 114 are provided on and projected from the outer right and left sides of the fairing 111. In the vicinity of the upper portions of the front forks 102 situated inside the fairing 111, there is carried a meter unit 115 including a speedometer, a tachometer and various indicator lights.

On the rear portion of the body frame 101, there are swingablly disposed a pair of swing arms 116 through their respective pivots 117 and, between the body frame 101 and swing arms 116, there is interposed a rear suspension. On the rear end portions of the swing arms 116, there is rotatably supported a rear wheel 118. The rear wheel 118 can be driven or rotated through a driven sprocket 120 with a chain 119 wound therearound. Also, there is fixed a rear fender 1 to the rear end portion of the body frame 101 so as to cover the upper portion of the rear wheel 118.

Substantially in the central portion of the motorcycle, there is carried an engine unit 121 on board the body frame 101 through a plurality of engine hangers; and, to the engine unit 121, there can be supplied the air from an air cleaner. Exhaust gas, which is produced after the air is combusted in the engine unit 121, is exhausted from the rear portion of the motorcycle through an exhaust pipe 122 and a muffler 123 connected to the exhaust pipe 122.

Also, above the engine unit 121, there is disposed a fuel tank 124 and, in the rear of the fuel tank 124, there are continuously disposed a seat 125 and a side cover 126. The seat 125 is supported on a pair of seat rails 127 (see FIG. 3). By the way, the pair of seat rails 127 and a pair of pillar tubes 128, as shown in FIG. 3, cooperate together in forming a rear frame and are respectively connected to the body frame 101; and, on the rear portion of the seat 125, there is mounted a rear carrier 129.

Figure 3:
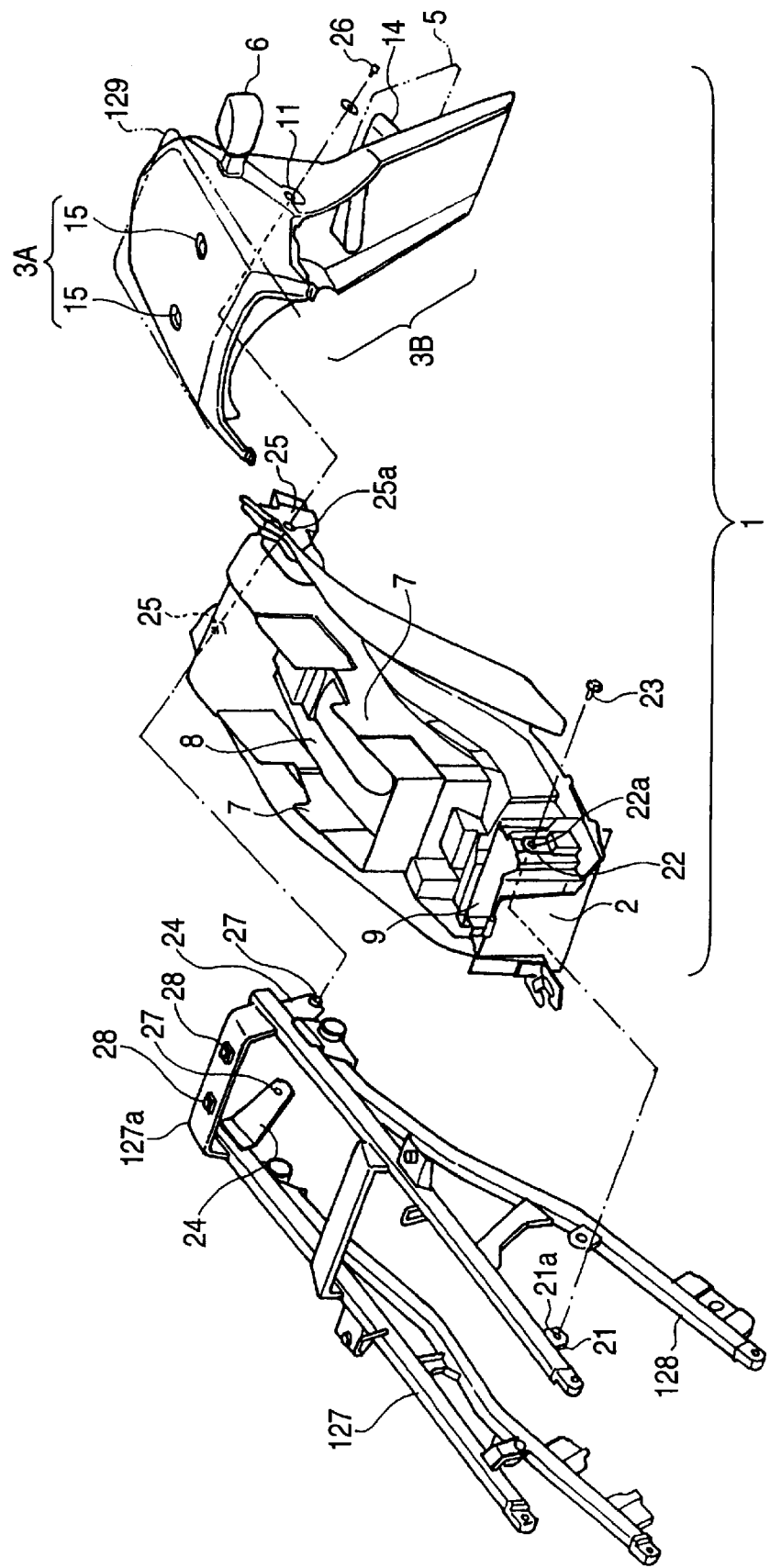
FIG. 3 is an exploded perspective view of a motorcycle rear body structure according to an embodiment of the invention.

Now, FIG. 3 shows a motorcycle rear body structure according to the invention. In FIG. 3, the rear fender 1 is structured such that a rear fender front half 2 is connected to a rear fender rear half 3 composed of a seat tail cowl portion 3A for covering the rear portion of the seat 125 and a fender tail portion 3B for covering the rear portion of the rear wheel 118, while the two portions 3A and 3B are formed as an integral body; and, on the rear fender rear half 3, there are mounted a tail light serving also as a brake light, a license plate illuminating light for illuminating a license plate mounting portion and a license plate 5, and a pair of direction indicating lights 6, whereby the rear fender 1 is formed as a unit.

In the vicinity of the rear portion of the rear fender front half 2, there are erected at least a pair of right and left vertical walls 7, while the upper surface of the rear portion of the rear fender front half 2 and the seat tail cowl portion 3A cooperate together in defining a baggage storage portion 8 inside the vertical walls 7. Also, the rear fender front half 2 includes an onboard-motorcycle battery (not shown) storage portion 9 the front portion of which is integrally projected into the upper surface of the front portion of the rear fender front half 2.

Now, FIG. 4 shows the structure of the rear fender rear half 3. On the side surface portion of the rear fender rear half 3, in the seat tail cowl portion 3A, there is formed a mounting portion 10 for mounting the direction indicating light 6 and, in the fender tail portion 3B, there is formed a mounting portion 11 for mounting the rear fender rear half 3 itself onto the body frame side; and, in these mounting portions 10, 11, there are formed through holes, respectively.

Also, in the upper portion of the rear surface portion of the rear fender rear half 3, there is opened up a mounting hole 12 for mounting the tail light 4 and, on the central portion of the rear fender rear half 3, there are disposed a lamp base 13 for a license plate illuminating light and a license plate mounting portion 14. By the way, on the upper surface portion of the seat tail cowl portion 3A, there is formed a mounting portion 15 for mounting the rear fender rear half 3 itself onto the body frame side.

Figure 5B:
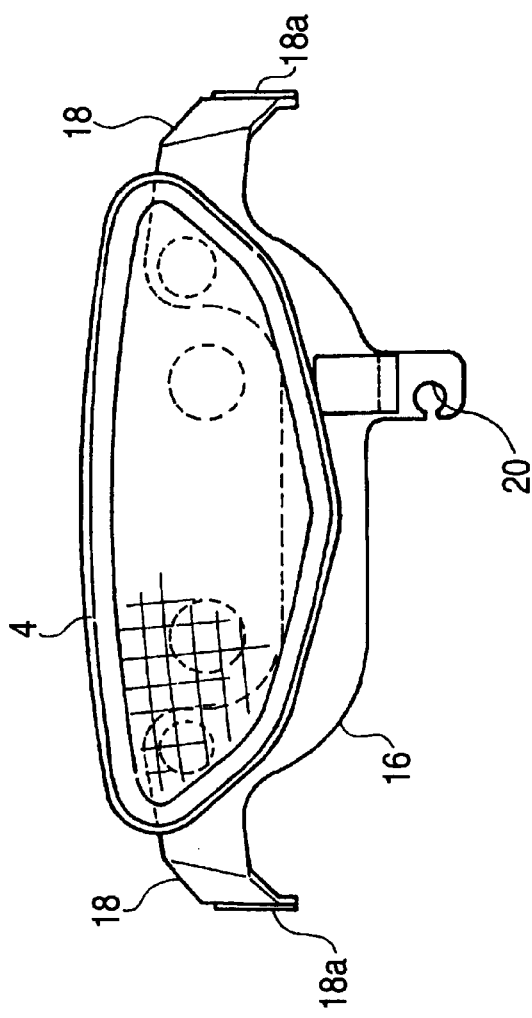
FIGS. 5A and 5B are side and front views of a tail light of a motorcycle rear body structure according to the above embodiment of the invention.
Figure 5A:
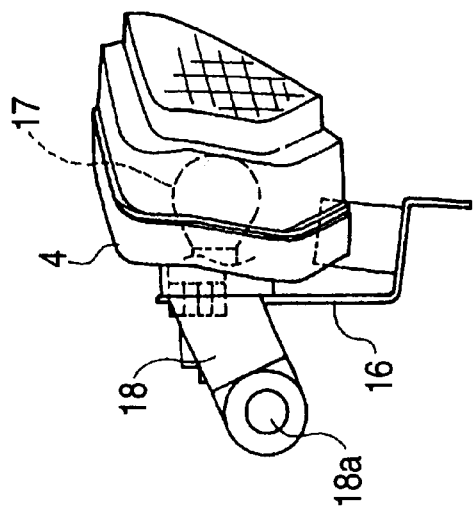

Now, FIG. 5 shows the structure of the tail light 4. The tail light 4 can be mounted onto the rear wheel fender rear part through a tail light bracket 16 which is mounted on the interior of the seat tail cowl portion 3A of the rear wheel fender rear part. By the way, in the interior of the tail light 4, there are disposed a plurality of lights 17. The tail light bracket 16 extends forwardly along the inner surfaces of the right and left side walls of the seat tail cowl portion 3A and includes a pair of right and left stay portions 18 each having a fastening portion 18a in the front end portion thereof. As will be discussed later, in the case of the stay portions 18, the bolts 6a disposed on the base portion of the direction indicating light 6 are inserted into through holes formed in the fastening portions 18a, whereby the stay portions 18 and the seat tail cowl portion 3A can be fastened and fixed to each other. Also, in the lower portion of the tail light bracket 16, there is formed an engaging portion 20 which can be engaged with a boss 19 (FIG. 7) which is provided on and projected from the inner surface of the rear portion of the rear fender rear half 3.

Here, in the above structure, in FIG. 3, in the front portion of the rear fender front half 2, there are formed a pair of fastening portions 22 for fastening and supporting the side walls of the storage portion 9 onto a pair of rear fender bracket front portions 21 disposed on the front portions of the seat rails 127 of the rear frame. In each of the fastening portions 22, there is formed a through hole 22a through which a bolt 23 can be inserted and, in each of the rear fender bracket front portions 21, there is formed a screw portion 21a which can be threadedly engaged with its associated bolt 23.

Also, in the rear portion of the rear fender front half 2, there are formed a pair of fastening portions 25 which can be fastened and supported onto a pair of rear fender bracket rear portions 24 respectively disposed on the rear portions of the seat rails 127. In each of the fastening portions 25, there is opened up a mounting through hole 25a through which a bolt 26 can be inserted. Also, on each of the rear fender bracket rear parts 24, there is disposed a projection-shaped boss 27 including a screw portion which can be threadedly engaged with the bolt 26, while the projection-shaped bosses 27 are formed such that they can be engaged into their respective mounting through holes 25a.

Further, in the rear frame bridge rear portion 127a of the seat rails 127, there are formed a pair of screw portions 28 to be threadedly engageable with bolts (not shown) which are used to fasten the upper surface of the seat tail cowl portion 3A together with the carrier 129.

Figure 7:
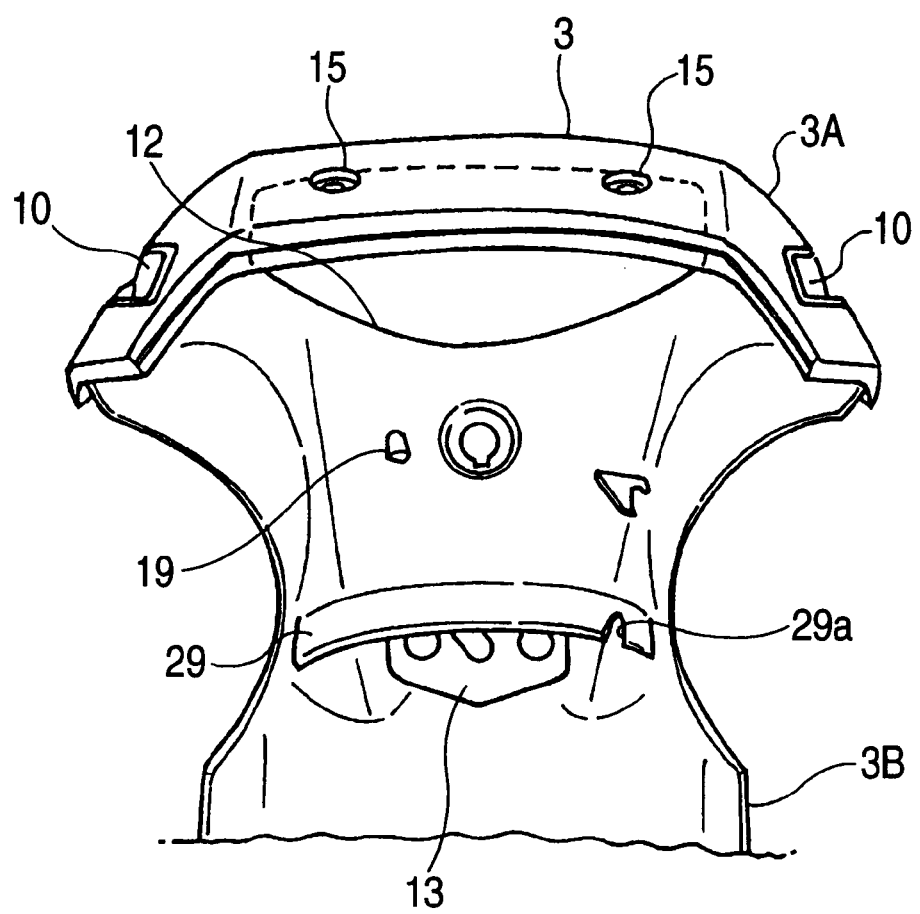
FIG. 7 shows a rib disposed in the rear fender rear half of a motorcycle rear body structure according to the above embodiment of the invention.
Figure 8:
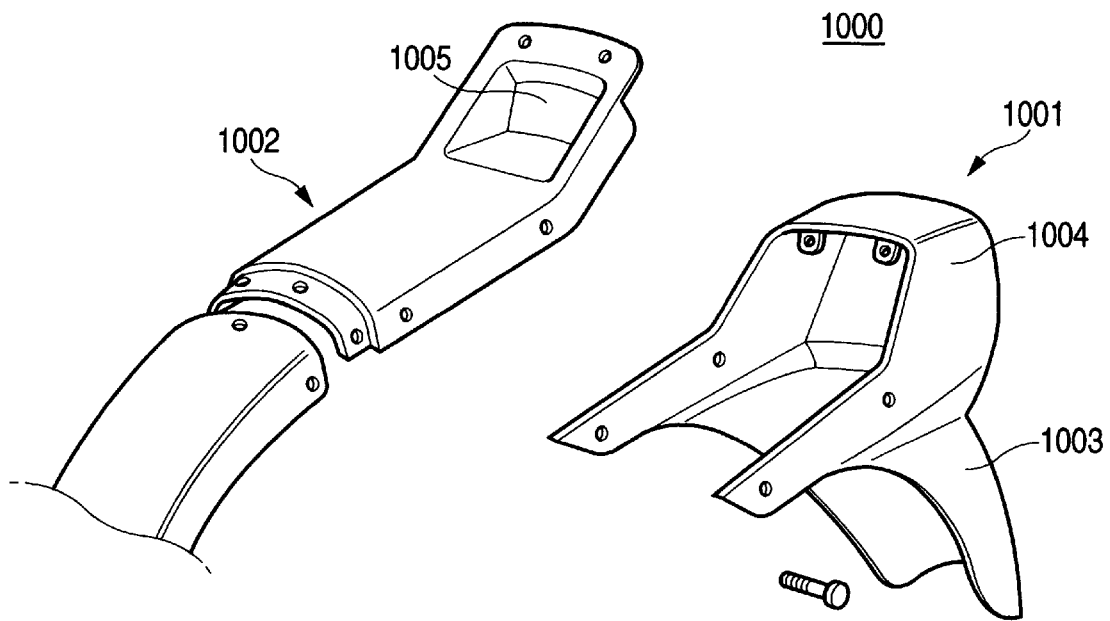
FIG. 8 shows a conventional motorcycle rear body structure.

Also, as shown in FIG. 7, in the portion of the rear fender rear half 3 where it is connected with the rear fender front half 2, between the seat tail cowl portion 3A and fender tail portion 3B of the rear fender rear half 3, there is disposed a shelf-shaped rib 29. And, the rear end portion of the rear fender front half 2 can be superimposed on and connected to the rib 29 from above. By the way, in the proper portion of the rib 29, there is formed a notch 29a for guiding and positioning the lead wire of the license plate illuminating light mounted on the lamp base 13 (FIG. 4).

Figure 6A:
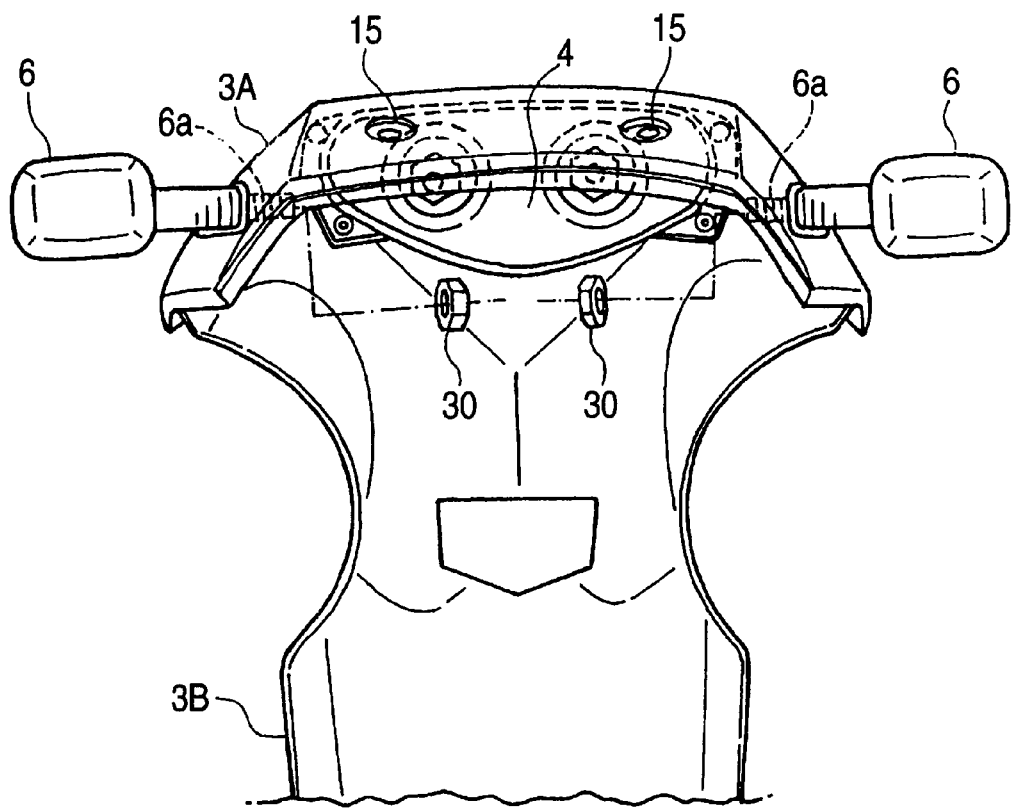
FIGS. 6A and 6B show a step of assembling a tail light and direction indicating lights of a motorcycle rear body structure according to the above embodiment of the invention, and a state thereof in which they are assembled.

In the above structure, the rear fender rear half 3 is assembled as a unit in such a manner that the tail light 4, the license plate illuminating light for illuminating the license plate 5 and the right and left direction lights 6 are mounted on the rear fender rear half 3. In this unit assembling operation, firstly, with reference to FIG. 6, the tail light 4 is fitted into the mounting hole 12 of the rear fender rear half 3. And, the through holes of the fastening portions 18a of the stay portions 18 are matched in position to the mounting portions 10 of the seat tail cowl portion 3A, and the bolts 6a of the direction indicating lights 6 are inserted through the through holes formed in the mounting portions 10 and the through holes of the fastening portions 18a (FIG. 6A)). By the way, in this case, the engaging portion 20 of the tail light bracket 16 is engaged with the boss 19 of the rear fender rear half 3.

Figure 6B:
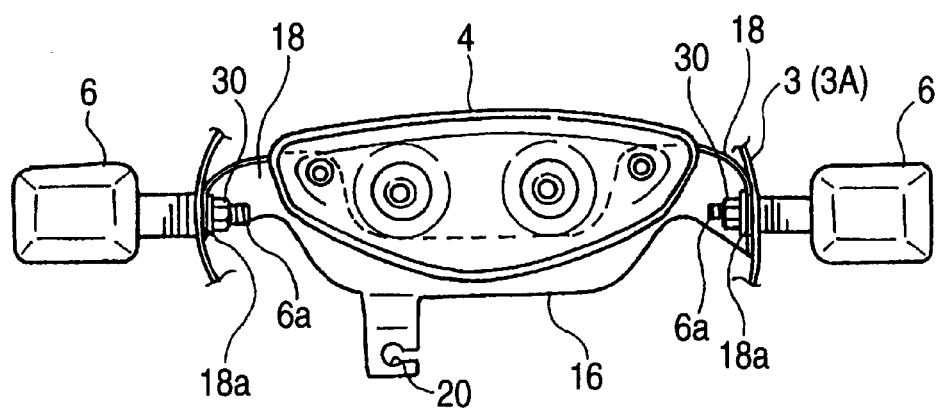

And, the nuts 30 are then threadedly engaged with the bolts 6a; and, the bolts 6a and nuts 30 are fastened together to thereby fasten and fix the stay portions 18 and seat tail cowl portion 3A to each other (FIG. 6B). Also, the license plate illuminating light is mounted onto the lamp base 13, while the license plate 5 is mounted onto the license plate mounting portion 14. Thus, the tail light 4 and right and left direction indicating lights 6 are mounted in this manner to thereby be able to assemble the rear fender rear half 3 into a unit.

The rear fender rear half 3, which has been assembled into a unit, is then mounted onto the body frame side. In this case, as shown in FIG. 3, the bolts 23, which have been inserted through the through holes 22a of the fastening portions 22 in the front portion of the rear fender front half 2, are threadedly engaged with the screw portions 21a of the rear fender bracket front portions 21, so that the rear fender front half 2 can be fastened and supported.

Also, the rear portion of the fender front part 2 is fastened and supported onto the rear fender bracket rear parts 25 respectively disposed on the rear portion of the rear frame (seat rails 127). In this case, the through holes 25a of the rear fender front half 2 are engaged with the projection-shaped bosses 27 disposed on the rear fender bracket rear parts 24 situated in the rear portions of the seat rails 127. Further, after the bolts 26 are inserted through the through holes of the mounting portions 11 formed in the lower portions of the side surfaces of the seat tail cowl portion 3A, the bolts 26 are threadedly engaged with the screw portions of the projection-shaped bosses 27 to thereby fasten the rear fender front half 2 and seat tail cowl portion 3A to each other.

The upper surface of the seat tail cowl portion 3A, together with the carrier 129, and the rear frame bridge rear part 127a of the rear frame are fastened and fixed to each other. In this case, after the bolts are inserted through the through holes (not shown) of the carrier 129 and the through holes of the mounting portions 15 of the seat tail cowl portion 3A, these bolts are threadedly engaged with the screw portions of the rear frame bride rear part 127a.

When mounting the rear fender rear half in the above-mentioned manner, the rear end portion of the rear fender front half 2 is superimposed on and connected to the shelf-shaped rib 29, which is disposed between the seat tail cowl portion 3A and fender tail portion 3B, from above.

In a motorcycle rear body structure according to the invention, the rear fender rear half 3 of the rear fender 1 is formed as an integral body composed of the seat tail cowl portion 3A for covering the rear portion of the seat 125 and the fender tail portion 3B for covering the rear portion of the rear wheel 118; and, therefore, as can be seen from FIG. 4 as well, the rear fender rear half 3 provides a very neat appearance. Accordingly, the appearance of the rear fender rear half 3 can be enhanced, the mutual connecting strength between the seat tail cowl portion 3A and fender tail portion 3B can be increased, and screws necessary to connect them together can be omitted. That is, not only the appearance and strength of the rear fender rear half 3 can be enhanced but also the number of parts can be reduced.

Also, when mounting the tail light 4 or the direction indicating lights 6 onto the thus integrated rear fender rear half 3, in case where the tail light 4 or the direction indicating lights 6 are fastened and fixed to each other using the bolts 6a of the two direction indicator lights 6, screws for mounting the tail light 4 can be omitted. In this case, the tail light bracket 16 of the tail light 4 can prevent the mounting seat surfaces of the direction indicating lights 6 of the seat tail cowl portion 3A from buckling under the pressure of the nuts 30. As a result of this, it is possible to omit washers which have been conventionally indispensable together with fastening nuts.

When mounting the tail light 4, in case where the engaging portion 20 of the tail light 4 is engaged with the boss 19 of the rear fender rear half 3, not only the tail light 4 can be properly positioned when assembling but also the mounting play of the tail light 4 after assembled can be prevented.

When mounting the unit-formed rear fender rear half 3 onto the motorcycle body frame side, the rear fender rear half 3 and rear fender front half 2 are fastened to each other in the lower portions of the side surfaces of the seat tail cowl portion 3A, or the rear fender rear half 3 and the rear carrier 129 together with the rear frame bridge rear part 127a are fastened and fixed to each other in the upper surface portion of the seat tail cowl portion 3A. Thus, by such mutual fastening of the unit-formed rear fender rear half 3 in its proper portions to its mating parts, there can be omitted mounting bolts which are necessary when the rear fender rear half 3 is composed of separate parts. Further, by mounting the rear fender rear half 3 in this manner, the upper surface of the rear portion of the rear fender front half 2 and the seat tail cowl portion 3A cooperate together in securing the wide baggage storage portion 8 inside the vertical walls 7, which makes it possible to make effective use of the space within the seat tail cowl portion 3A.

Also, when mounting the rear fender rear half 3, by disposing the rib 29 in the mutual connecting portion between the seat tail cowl portion 3A and fender tail portion 3B, invasion of water or muddy water into the rear fender rear half 3 can be prevented effectively. Also, the lead wire of the license plate illuminating light mounted on the lamp base 13 (FIG. 4) can be positioned by the notch 29a of the rib 29, which can facilitate the arrangement of wires.

Although the invention has been described heretofore using its various embodiments, the invention is not limited to these embodiments but various changes and modifications are also possible without departing from the scope of the invention.

For example, the invention can be effectively applied not only to a motorcycle of the illustrated type but also to a vehicle including a rear fender of this type; and, in this case as well, there can be provided similar operations and effects to the above-mentioned embodiments of the invention.

As has been described hereinbefore, according to the invention, in a motorcycle rear body structure of this type, the rear fender thereof is formed as an integrated body. The thus integrated rear fender is enhanced in the appearance and strength thereof and allows a reduction in the number of parts. That is, when mounting the rear fender onto the motorcycle body frame side, the composing parts of the rear fender can be fastened to each other, which can omit screws and bolts. This can simplify the structure of the rear fender and can reduce the number of steps for assembling the rear fender, thereby being able to reduce the manufacturing cost of the rear fender and thus the cost of a product or a motorcycle.

What is claimed is:

1. A motorcycle rear body structure with a rear fender disposed in the periphery of a rear wheel, comprising:

a rear fender having a rear fender front half and a rear fender rear half connected to each other, said rear fender rear half including an integral body of a seat tail cowl portion and a fender tail portion, wherein a tail light serving also as a brake light, a license plate mounting portion and a license plate, and a pair of right and left direction indicating lights are mounted on a rear wheel rear fender constituted by said rear fender rear half, thereby forming said rear wheel rear fender as a unit, and wherein said tail light is mounted on said rear wheel rear fender through a tail light bracket to be mounted on the interior of said seat tail cowl portion of said rear wheel rear fender, and also wherein said tail light bracket extends forwardly along the inner surfaces of the right and left side walls of said seat tail cowl portion, and includes right and left stay portions each having a fastening portion in the front end portion thereof, while said stay portions and said seat tail cowl portion are fastened and fixed to each other by bolts disposed in the base portions of said direction indicating lights.

2. A motorcycle rear body structure with a rear fender disposed in the periphery of a rear wheel, comprising:

a rear fender having a rear fender front half and a rear fender rear half connected to each other, said rear fender rear half including an integral body of a seat tail cowl portion and a fender tail portion, wherein a tail light serving also as a brake light, a license plate mounting portion and a license plate, and a pair of right and left direction indicating lights are mounted on a rear wheel rear fender constituted by said rear fender rear half, thereby forming said rear wheel rear fender as a unit, and wherein, in the connecting portion between said rear fender front half and said rear fender rear half, the rear end portion of said rear fender front half is superimposed on and connected to a shelf-shaped rib from above, said rib being interposed between said seat tail cowl portion and said fender tail portion of said rear fender rear half, and said seat tail cowl portion of said rear fender rear half and the upper surface of the rear portion of said rear fender front half cooperate together in forming a baggage storage portion.

3. A motorcycle rear body structure with a rear fender disposed in the periphery of a rear wheel, comprising:

a rear fender having a rear fender front half and a rear fender rear half connected to each other, said rear fender rear half including an integral body of a seat tail cowl portion and a fender tail portion, wherein a tail light serving also as a brake light, a license plate mounting portion and a license plate, and a pair of right and left direction indicating lights are mounted on a rear wheel rear fender constituted by said rear fender rear half, thereby forming said rear wheel rear fender as a unit, and wherein, in the case of a rear wheel fender front part constituted by said rear fender front half, the front portion thereof is fastened to and supported on a rear fender bracket front portion disposed on the front portion of a rear frame through the side walls of an onboard-motorcycle battery storage portion integrally projected up to the upper surface of said rear wheel fender front part, while the rear portion of said rear wheel fender front part is fastened to and supported on a rear fender bracket rear portion disposed on the rear portion of said rear frame; in the case of said rear wheel fender rear part, the upper surface of said seat tail cowl portion together with a rear carrier and the rear frame bridge rear portion of said rear frame are fastened and fixed to each other, while the lower portions of the side surfaces of said seat tail cowl portion together with the rear portion of said rear wheel fender front part and said rear fender bracket rear portion are fastened and fixed to each other; and, a projection-shaped boss is disposed on said rear fender bracket rear portion, while the rear portion mounting hole of said rear fender front half is formed so as to be engageable with said projection-shaped boss.

4. A motorcycle, comprising:

a body frame carrying thereon an engine, a fuel tank and a seat, wherein a front wheel is rotatably supported by the lower ends of a pair of front forks supported on a steering head pipe disposed on the upper front portion of said body frame, while a rear wheel is rotatably supported by a pair of swing arms disposed on the lower rear portion of said body frame, and a motorcycle rear body structure with a rear fender disposed in the periphery of a rear wheel, comprising:

a rear fender having a rear fender front half and a rear fender rear half connected to each other, said rear fender rear half including an integral body of a seat tail cowl portion and a fender tail portion, wherein a tail light serving also as a brake light, a license plate mounting portion and a license plate, and a pair of right and left direction indicating lights are mounted on a rear wheel rear fender constituted by said rear fender rear half, thereby forming said rear wheel rear fender as a unit, and wherein said tail light is mounted on said rear wheel rear fender through a tail light bracket to be mounted on the interior of said seat tail cowl portion of said rear wheel rear fender, and also wherein said tail light bracket extends forwardly along the inner surfaces of the right and left side walls of said seat tail cowl portion, and includes right and left stay portions each having a fastening portion in the front end portion thereof, while said stay portions and said seat tail cowl portion are fastened and fixed to each other by bolts disposed in the base portions of said direction indicating lights.

5. A motorcycle, comprising:

a body frame carrying thereon an engine, a fuel tank and a seat, wherein a front wheel is rotatably supported by the lower ends of a pair of front forks supported on a steering head pipe disposed on the upper front portion of said body frame, while a rear wheel is rotatably supported by a pair of swing arms disposed on the lower rear portion of said body frame, and a motorcycle rear body structure with a rear fender disposed in the periphery of a rear wheel, comprising:

a rear fender having a rear fender front half and a rear fender rear half connected to each other, said rear fender rear half including an integral body of a seat tail cowl portion and a fender tail portion, wherein a tail light serving also as a brake light, a license plate mounting portion and a license plate, and a pair of right and left direction indicating lights are mounted on a rear wheel rear fender constituted by said rear fender rear half, thereby forming said rear wheel rear fender as a unit, and wherein, in the connecting portion between said rear fender front half and said rear fender rear half, the rear end portion of said rear fender front half is superimposed on and connected to a shelf-shaped rib from above, said rib being interposed between said seat tail cowl portion and said fender tail portion of said rear fender rear half, and said seat tail cowl portion of said rear fender rear half and the upper surface of the rear portion of said rear fender front half cooperate together in forming a baggage storage portion.

6. A motorcycle, comprising:

a body frame carrying thereon an engine, a fuel tank and a seat, wherein a front wheel is rotatably supported by the lower ends of a pair of front forks supported on a steering head pipe disposed on the upper front portion of said body frame, while a rear wheel is rotatably supported by a pair of swing arms disposed on the lower rear portion of said body frame, and a motorcycle rear body structure with a rear fender disposed in the periphery of a rear wheel, comprising:

a rear fender having a rear fender front half and a rear fender rear half connected to each other, said rear fender rear half including an integral body of a seat tail cowl portion and a fender tail portion, wherein a tail light serving also as a brake light, a license plate mounting portion and a license plate, and a pair of right and left direction indicating lights are mounted on a rear wheel rear fender constituted by said rear fender rear half, thereby forming said rear wheel rear fender as a unit, and wherein, in the case of a rear wheel fender front part constituted by said rear fender front half, the front portion thereof is fastened to and supported on a rear fender bracket front portion disposed on the front portion of a rear frame through the side walls of an onboard-motorcycle battery storage portion integrally projected up to the upper surface of said rear wheel fender front part, while the rear portion of said rear wheel fender front part is fastened to and supported on a rear fender bracket rear portion disposed on the rear portion of said rear frame; in the case of said rear wheel fender rear part, the upper surface of said seat tail cowl portion together with a rear carrier and the rear frame bridge rear portion of said rear frame are fastened and fixed to each other, while the lower portions of the side surfaces of said seat tail cowl portion together with the rear portion of said rear wheel fender front part and said rear fender bracket rear portion are fastened and fixed to each other; and, a projection-shaped boss is disposed on said rear fender bracket rear portion, while the rear portion mounting hole of said rear fender front half is formed so as to be engageable with said projection-shaped boss.

* * * * *